(12) United States Patent
Claes et al.

(10) Patent No.: US 7,599,297 B2
(45) Date of Patent: Oct. 6, 2009

(54) ACCESS NETWORK WITH TRUSTED REAL TIME FEEDBACK

(75) Inventors: Erik Claes, Wilrijk (BE); Piet Vandaele, Gent (BE); Erwin Six, Kalken (BE)

(73) Assignee: Alcatel, Paris (FR)

( * ) Notice: Subject to any disclaimer, the term of this patent is extended or adjusted under 35 U.S.C. 154(b) by 601 days.

(21) Appl. No.: 11/291,963

(22) Filed: Dec. 2, 2005

(65) Prior Publication Data

US 2007/0014242 A1    Jan. 18, 2007

(30) Foreign Application Priority Data

Dec. 23, 2004    (EP) .................................. 04293125

(51) Int. Cl.
*H04L 1/00*    (2006.01)
(52) U.S. Cl. ...................... 370/236; 370/252
(58) Field of Classification Search ................. 370/236, 370/252
See application file for complete search history.

(56) References Cited

U.S. PATENT DOCUMENTS 6,754,311 B1 * 6/2004 Kampmeier et al. ..... 379/32.01

(Continued)

FOREIGN PATENT DOCUMENTS

EP    1 168 755 A    1/2002

(Continued)

*Primary Examiner*—Andrew Lee
(74) *Attorney, Agent, or Firm*—Harness, Dickey & Pierce

(57) ABSTRACT

A Method for providing a trusted feedback (8, 80) in an access network (1) is described, wherein a real time service monitor (7, 70) for real time monitoring the quality of service provided to at least one user (4, 40) by a server (3, 30) via the access network (1) is placed in an access multiplexer (2, 20) being the last part of the access network (1) towards the user (4, 40), wherein the real time service monitor (7, 70) is sending a trusted feedback signal (8, 80) from the access multiplexer (2, 20) at least back to the server (3, 30), which signal (8, 80) comprises real time information about the quality of service passing through the access multiplexer (2, 20), plus an access network (1) comprising at least one data link connecting at least one access multiplexer (2, 20) being the last part of the access network (1) towards at least one user (4, 40) with a core network or at least one server (3, 30) providing a service (6, 60) to the user (4, 40) connected to the access network (1) via the access multiplexer (2, 20) is described, wherein a real time service monitor (7, 70) is arranged in the access multiplexer (2, 20) providing real time monitoring of the quality of service passing through the access multiplexer (2, 20), wherein the real time service monitor (7, 70) provides a trusted feedback signal (8, 80) to the server (3, 30) comprising information about the quality of service in real time, plus an access multiplexer (2, 20) adapted to receive a multimedia signal (6, 60) from a multimedia provider (3, 30) and to forward at least part of said multimedia signal (6, 60) to at least one user (4, 40) is described wherein said access multiplexer (2, 20) comprises a real-time service monitor (7, 70) adapted to collect information about the multimedia signal (6, 60) passing the access multiplexer (2, 20) and being transmitted between said multimedia provider (3, 30) and a particular user (4, 40).

15 Claims, 2 Drawing Sheets

U.S. PATENT DOCUMENTS

Figure 1:
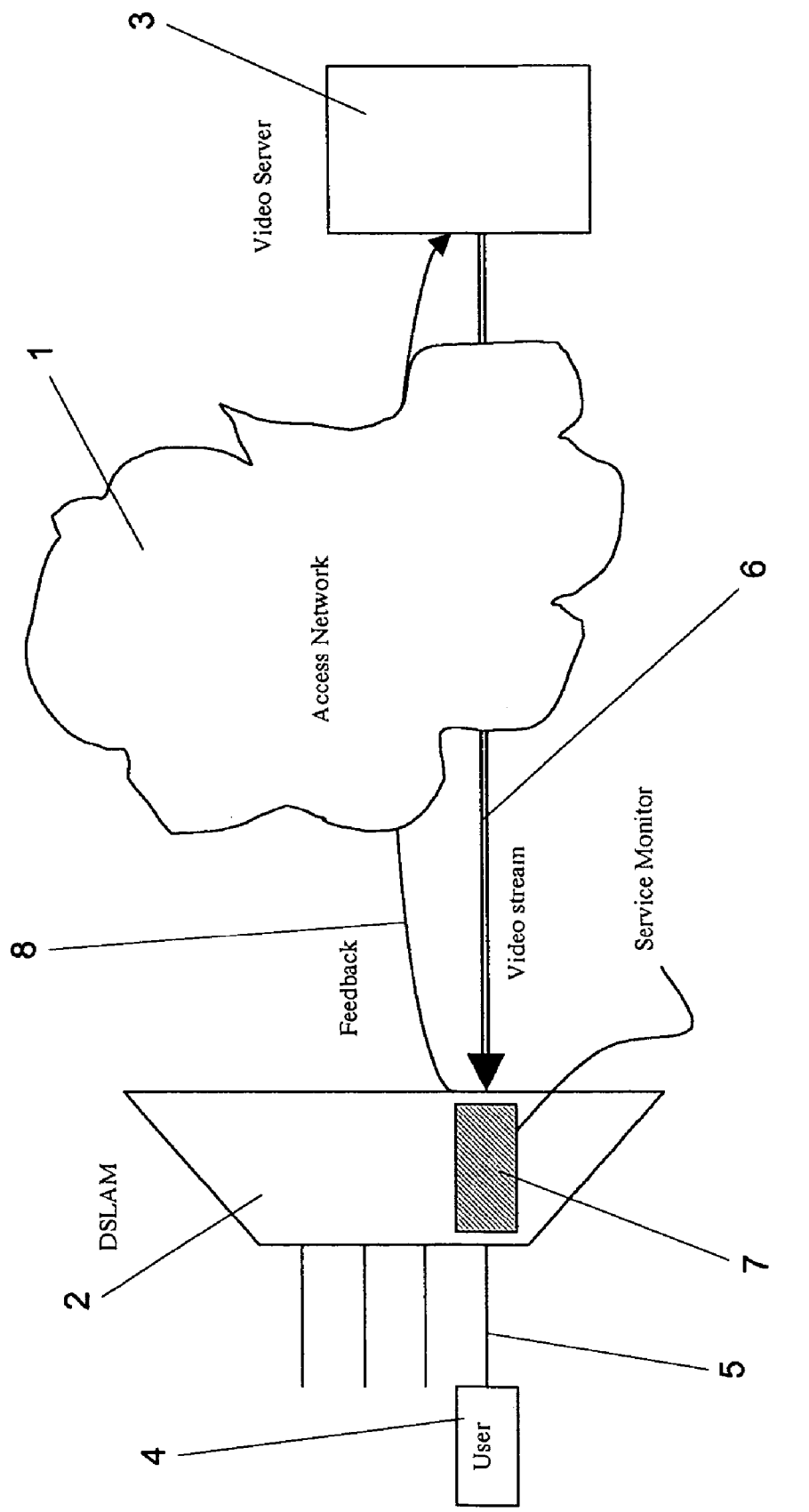

| | | |
|---|---|---|
| 7,096,260 B1 * | 8/2006 | Zavalkovsky et al. ....... 709/223 |
| 2002/0018443 A1 * | 2/2002 | Vleesschauwer et al. .... 370/229 |
| 2003/0063569 A1 * | 4/2003 | Kalliokulju et al. ......... 370/252 |
| 2003/0142625 A1 * | 7/2003 | Wan et al. ................... 370/235 |
| 2003/0182666 A1 | 9/2003 | You |
| 2004/0122975 A1 * | 6/2004 | Lennestal et al. ........... 709/245 |
| 2005/0201414 A1 * | 9/2005 | Awais ........................ 370/468 |
| 2006/0003781 A1 * | 1/2006 | Jin et al. ..................... 455/509 |
| 2006/0062216 A1 * | 3/2006 | Li et al. ...................... 370/389 |

FOREIGN PATENT DOCUMENTS

| | | |
|---|---|---|
| JP | 2003 244238 A | 8/2003 |
| JP | 2004 048213 A | 2/2004 |

* cited by examiner

ACCESS NETWORK WITH TRUSTED REAL TIME FEEDBACK

BACKGROUND OF THE INVENTION

The invention is based on a priority application EP 04 293 125.3 which is hereby incorporated by reference.

The invention relates to a method for providing a trusted feedback in an access network according to the specifying features of claim 1, plus an access network according to the specifying features of claim 6, plus an access multiplexer according to the specifying features of Claim 10.

Today, the Internet Protocol IP is becoming the unified network layer for transporting all sorts of services such as voice & video traffic. Typically, these services are very delay and/or jitter sensitive and the quality of the transported service will very much degrade by e.g. packet loss somewhere inside the network.

When transporting these services over an access network, the operator might require real time monitoring of the quality of the transported service associated with a dynamic feedback.

This dynamic feedback could be used e.g. by the source of the transport stream in order to change e.g. the compression and/or codec bit rate, or it could be used by the network operator's infrastructure to generate troubleshooting alerts, or by the billing system in order to give a reduction on the price for the service, e.g. when a Pay Per Use model is used for the service. The source can be e.g. a video server for video streaming, or a session border controller for voice services.

Today access multiplexer like Digital Subscriber Line Access Multiplexer, DSLAM, have some features available to monitor the traffic, however, these are overall statistics: e.g. overall packet loss inside the switch or packet loss inside a buffer of a line card, amount of bad checksums of packets on a certain PVC, etc. Moreover, these statistics are not specific to a certain service and not real-time at all. Their primary goal is to provide the network management on a daily, weekly or monthly basis with data for measuring the health of e.g. an access line. The data are transmitted via e.g. the Simple Network Management Protocol, SNMP.

The drawback of this proceeding is that the monitoring capabilities in today's DSLAMs are too general and deal with very node specific information that are not scheduled to be read on a per session basis. Furthermore the information is useless for end-to-end service monitoring, since it is node specific.

For real-time service monitoring, some features are available inside the transport layer for real time IP services. The Real Time Protocol, RTP, is typically used for transporting these services on UDP/IP (User Datagram Protocol). RTP also contains a protocol, called the Real Time Control Protocol, RTCP, which very frequently, e.g., every few seconds, delivers sender- and receiver-reports comprising a feedback about the end-to-end, i.e. server to user quality of the real-time service regarding packet loss, jitter and delay.

Today, most of the real time transport migrates towards the RTP protocol. Some older technologies have however proprietary mechanism that includes most of the RTP transport features, though often without control protocol. The most known example is e.g. MPEG2_TS video transport over UDP and/or IP. This video encapsulation contains all RTP features.

If service feedback is needed, a dedicated feedback protocol other than RTCP is typically required to monitor on the fly the health of the service.

SUMMARY OF THE INVENTION

The drawback of this solution is that the RTCP or another protocol is used between e.g. the video server or the session border controller, which might be trusted, and the end-terminals, which should generally be considered untrusted. Therefore, the reports sent by the end-terminal can hardly be used as a trusted feedback loop for changing network-settings and/or billing conditions on the fly.

TECHNICAL PURPOSE OF THE INVENTION

The technical purpose of the invention is first to develop a method for providing a trusted feedback in an access network, second to develop an access network that allows a trusted feedback within at least the access network, and third to develop an access multiplexer being the last part of the access network towards the user that allows real time monitoring of the service provided to the user via the access network.

DISCLOSURE OF THE INVENTION AND ITS ADVANTAGES

The first part of the invention's technical purpose is met by said method for providing a trusted feedback in an access network according to claim 1, wherein a real time service monitor for real time monitoring the quality of service provided to at least one user by a server located e.g. in a core network via the access network is placed in an access multiplexer, e.g. a Digital Subscriber Line Access Multiplexer, DSLAM, being the last part of the access network towards the user, wherein the real time monitor is sending a trusted feedback signal from the access multiplexer at least back to the server, which signal comprises real time information about the quality of service passing through the access multiplexer. The information concerns e.g. delay, jitter, packet-loss, set up time, responsiveness and the like. The trusted signal sent back to the server is a real time signal. It can be sent simultaneously or within defined time periods e.g. every second. The service provided to the user by the server can be e.g. a special functionality like a video stream (video on demand), an audio stream (music download), or video conferencing via the Internet. When the quality of the service decreases, the real time service monitor will detect the decreasing quality of service passing through the access multiplexer in real time and will feed this information in real time to the feedback signal. Since the feedback signal is generated in the access network it is a trusted feedback. The trusted feedback signal can be used, e.g. for changing the settings of the server dynamically, e.g. the resolution of the video stream. It is also possible to be used to change the settings of the access network, e.g. the gain of an amplifier or re-routing the stream via a different path. Another option to use the trusted feedback signal is to dynamically change the billing of a service at the time a change of the quality of service is detected.

The basic idea is to embed functionality inside the access multiplexer, e.g. a DSLAM to produce trusted and service specific reports that can be used for fast feedback. These reports are made available for the server, e.g. a video server or a session border controller.

Said method with the specifying features of Claim 1 has the advantage over the state of the art, that the operator gets trusted statistics for every real time stream and that he gets a capability to detect differences between the untrusted reports from the end-terminals and the reports collected by the first hop of the access provider. By this service alerts can then be issued, e.g., to check bottlenecks inside the home network and/or malicious behavior of the customer. Another advantage is that when the Video Servers, used e.g. for Video-over-IP Service and/or the Session Border Controllers, used e.g. for Voice-over-IP Service use these capabilities of the access multiplexer a very clean end-to-end video/voice solution can be provided from the operator of the access network.

In a preferred embodiment of the invention, the trusted feedback signal is used for dynamically changing the settings of at least the server at the time when a change of the quality of service passing through the access multiplexer is detected by the real time service monitor. The settings to be dynamically changed can be e.g. the compression or the bit rate of a live stream.

In another preferred embodiment of said invention, the trusted feedback signal is used for dynamically changing the settings of at least the access network at the time when a change of the quality of service passing through the access multiplexer is detected by the real time service monitor.

In an additional preferred embodiment of the invention, the trusted feedback signal is used for dynamically changing a billing of the service provided to the user by the server according to the changing of the quality of service passing through the access multiplexer being detected by the real time service monitor.

In a particularly preferred embodiment of the invention, the trusted feedback signal in the access network is used for making a conclusion about the quality of an untrusted end-to-end feedback between the user and the server.

The second part of the invention's technical purpose is met by said access network according to claim 6, comprising at least one data link connecting at least one access multiplexer being the last part of the access network towards at least one user with a core network or at least one server providing a service to the user connected to the access network via the access multiplexer, that is characterized in that a real time service monitor is arranged in the access multiplexer providing real time monitoring of the quality of service provided to the user by the core network or the server passing through the access multiplexer, wherein the real time service monitor provides a trusted real time feedback signal to the server comprising information about the quality of service.

In a preferred embodiment of the invention, the trusted feedback signal is used to dynamically change the settings of at least the server and/or the access network at the time when the quality of the service changes.

In another preferred embodiment of said invention, the trusted feedback is used for dynamically changing the billing of the services provided to the user by the server at the time when the quality of service changes.

In an additional preferred embodiment of the invention, the trusted feedback is used for making a conclusion about the quality of an untrusted end-to-end feedback between the user and the server.

The third part of the invention's technical purpose is met by the proposed access Multiplexer according to claim 10 that is adapted to receive a multimedia signal from a multimedia provider and to forward at least part of said multimedia signal to at least one user, wherein said Access Multiplexer comprises a real-time service monitor adapted to collect e.g. end-to-end service information about the multimedia signal passing the access multiplexer and being transmitted between said multimedia provider and a particular user.

In a preferred embodiment of the invention, said multimedia signal is transmitted according to the Real-Time Protocol, RTP, and in that said end-to-end service information is derived from the Real-Time Transport Protocol such as RTP/RTCP information.

In a preferred embodiment of the invention, said Access Multiplexer is a Digital Subscriber Line Access Multiplexer belonging to an Access Network.

In an additional preferred embodiment of the invention, said Service Monitor makes said end-to-end service information available to other devices.

In a particularly preferred embodiment of the invention, one of said other devices is the multimedia server.

In another particularly preferred embodiment of the invention, said multimedia signal is a video stream, and in that said multimedia server is a video server.

BRIEF DESCRIPTION OF THE DRAWING, WITH

Figure 2:
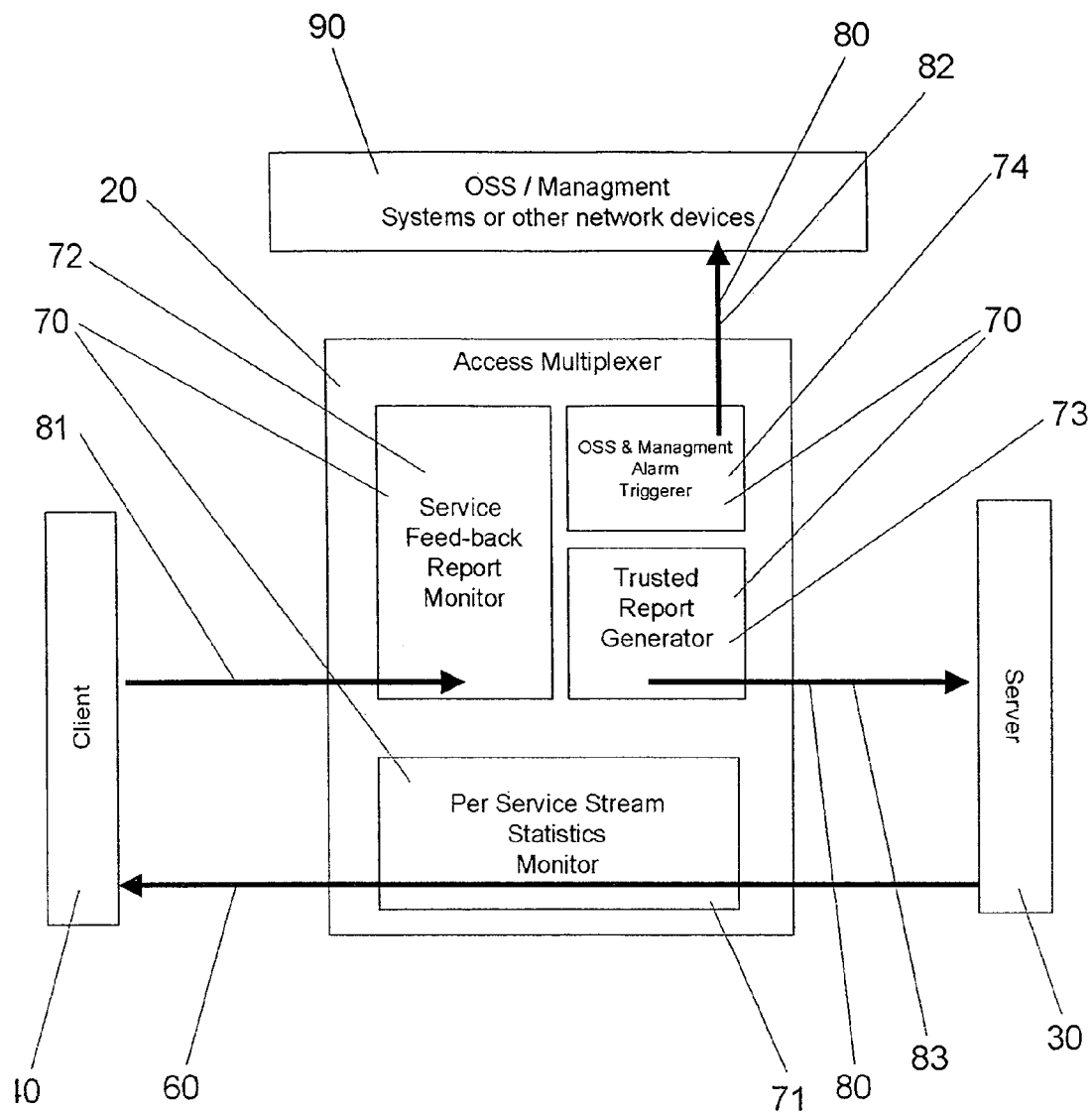

FIG. 1 showing a scheme of an access network connecting a user with a video server providing a service to the user via the access network and FIG. 2 showing a scheme of the architecture and the function of a service monitor arranged in an access multiplexer of an access network.

PATHS FOR PERFORMING THE INVENTION

An access network 1 as shown in FIG. 1, comprises a Digital Subscriber Line Access Multiplexer, DSLAM 2 and a data link connecting the DSLAM 2 with a video server 3. A user 4 is connected to the video server 3 by a low range data link 5 connected with the DSLAM 2. The DSLAM 2 terminates the low range data link 5 and converts it on the high range data link of the access network 1. In the same manner several users can be connected to an access network via one DSLAM 2. The DSLAM 2 is the last part of the access network 1 towards the user 4. The video server 3 provides a video stream 6 to the user 4. For real time monitoring the quality of the video stream 6 provided to the user 4 by the video server 3, a service monitor 7 is arranged in the DSLAM 2.

Real time monitoring of the quality of the transported service can be done by e.g. continuously monitoring the delay and/or jitter and/or packet loss and/or set up time and/or responsiveness of the video stream 6. The service monitor 7 provides a feedback to the video server 3 via the access network 1. Since the DSLAM 2 is the last trusted access network equipment towards the user 4, the feedback 8 is a trusted feedback that can be used for changing e.g. the settings of the access network 1 and/or the settings of the video server 3 and/or the settings of a billing system on the fly at the time a change in the quality of service provided to the user 4 by the video server 3 occurs and is detected by the service monitor 7.

The service provided to the user 4 can also be an access to a core network connected with the access network 1.

The invention is to embed inside the last trusted network equipment of the operator an agent implemented as real time service monitor 7 that particularly (a) detects automatically different types of real time traffic, and (b) starts doing service monitoring processes on those packet streams.

The invention provides a means for dynamic service monitoring of real time IP streams by providing a transport layer monitoring agent, e.g. a service monitor 7 inside an access multiplexer, e.g. a DSLAM.

The agent will also embed a functionality that will make this information available to other network elements like typically the other end-point of the real time traffic, e.g. the Video on Demand server in case of video, the manager of the TV head-end for broadcast TV, or the Session Border Controller for voice service.

This agent might additionally monitor service reports produced by the untrusted end-terminals, e.g. the user 4 (if available) and compares these reports with the data collected by himself. Major differences could then result in the generation of a service alert towards the management system.

FIG. 2 shows an access multiplexer 20, e.g. like the DSLAM 2 of FIG. 1, with a service monitor 70 comprising a per service stream statistics monitor 71 for monitoring the quality of service 60 provided to a client 40, e.g. the user 4 of FIG. 1, by a server 30, e.g. the video server 3 of FIG. 1. The service 60 could be e.g. the video stream 6 of FIG. 1. The access multiplexer 20 is the last equipment of an access network, e.g. the access network 1 of FIG. 1 towards the client 40. The service monitor 70 also comprises a service feedback report monitor 72 for monitoring the data stream from the client 40 towards the server 30 and for monitoring the untrusted end-to-end feedback 81 about the quality of service sent from the client 40 to the server 30. Both, the per service stream statistics monitor 71 and the service feedback report monitor 72 provide a trusted report generator 73 also comprised in the service monitor 70 with information about detected changes of the quality of service. The trusted report generator on the one hand is able to compare the untrusted end-to-end feedback 81 with the information collected by the per service stream statistics monitor 71. If both information match, also the end-to-end feedback can be considered as a trusted feedback. If they do not match a real time service alert 82 towards the Operational Support System OSS, or the management system 90 of the network is generated by an OSS and management alarm trigger 74 also comprised in the service monitor 70. The trusted report generator 73 is sending in real time a trusted feedback 83 towards the server 30 comprising an information about the quality of service monitored by the per service stream statistics monitor 71. Both, the real time service alert 82 and the trusted real time feedback 83 are part of a real time feedback signal 80, e.g. the feedback 8 of FIG. 1.

COMMERCIAL APPLICABILITY

The invention is commercially applicable particularly in the field of production and operation of networks for optical and/or electromagnetic data transmission.

LIST OF REFERENCE NUMERALS

1 Access Network
2 DSLAM
3 Video Server
4 User
5 Low Range Data Link
6 Video Stream
7 Service Monitor
8 Feedback
20 Access Multiplexer
30 Server
40 Client
60 Service
70 Service Monitor
71 Per Service Stream Statistics Monitor
72 Service Feedback Report Monitor
73 Trusted Report Generator
74 Operational Support System and Management Alarm Trigger
80 Real Time Feedback Signal
81 Untrusted End-To-End Feedback
82 Real Time Service Alert
83 Trusted Real Time Feedback
90 Operational Support System/Management System of the Network

The invention claimed is:

1. Method for providing a trusted feedback in an access network, the method comprising:
   monitoring in real time, at a real time service monitor, a quality of service, the quality of service provided to at least one user by a server via an access network, the real time service monitor placed in an access multiplexer that is a last part of the access network before the at least one user; and
   sending, at a real time service monitor, a trusted feedback signal from the access multiplexer to the server, the trusted feedback signal including real time information about the quality of service passing through the access multiplexer.

2. The method according to claim 1, further comprising:
   dynamically changing, using the trusted feedback signal, settings of at least the server if a change in the quality of service passing through the access multiplexer is detected by the real time service monitor.

3. The method according to claim 1, further comprising:
   dynamically changing, using the trusted feedback signal, settings of at least the access network if a change in the quality of service passing through the access multiplexer is detected by the real time service monitor.

4. The method according to claim 1, further comprising:
   dynamically changing, using the trusted feedback signal, a billing of service provided to the user by the server according to a change in the quality of service passing through the access multiplexer and detected by the real time service monitor.

5. The method according to claim 1 further comprising:
   making a conclusion, using the trusted feedback signal, about a quality of an untrusted end-to-end feedback between the user and the server.

6. An access network comprising:
   at least one data link connecting at least one access multiplexer with at least one of a core network and at least one server, the at least one server providing a service to a user connected to the access network via the access multiplexer, the at least one access multiplexer being the last part of the access network before the user,
   a real time service monitor arranged in the access multiplexer, the real time service monitor (i) providing real time monitoring of a quality of service passing through the access multiplexer, and (ii) providing a trusted feedback signal to the server, the trusted feedback signal including information about the real time quality of service.

7. The access network according to claim 6, wherein the trusted feedback signal is used to dynamically change settings of at least one of the server and the access network when the quality of service changes.

8. The access network according to claim 6, wherein the trusted feedback is used for dynamically changing billing of services provided to the user by the server when the quality of service changes.

9. The access network according to claim 6, wherein the trusted feedback is used for making a conclusion about a quality of an untrusted end-to-end feedback between the user and the server.

10. An access multiplexer configured to receive a multimedia signal from a multimedia provider and to forward at least part of said multimedia signal to at least one user, the access multiplexer comprising:
 a real-time service monitor configured to collect information about the multimedia signal (i) passing the access multiplexer and (ii) being transmitted between a multimedia provider and a particular user.

11. The access Multiplexer according to claim 10, wherein the multimedia signal is transmitted according to a Real-Time Protocol (RTP), such that an end-to-end service information is derived from the Real-Time Transport Protocol, the end-to-end service information including at least RTP/RTCP information.

12. The access Multiplexer according to claim 10, wherein the Access Multiplexer is a Digital Subscriber Line Access Multiplexer belonging to an access network.

13. The access Multiplexer according to claim 10, wherein the real time service monitor makes end-to-end service information available to at least one other devices.

14. The access Multiplexer according to claim 13, wherein one of the at least one other devices is a multimedia server.

15. The access Multiplexer according to claim 14, wherein the multimedia signal is a video stream, and the multimedia server is a video server.

* * * * *

UNITED STATES PATENT AND TRADEMARK OFFICE
CERTIFICATE OF CORRECTION

PATENT NO. : 7,599,297 B2 Page 1 of 1
APPLICATION NO. : 11/291963
DATED : October 6, 2009
INVENTOR(S) : Claes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this

Twenty-eighth Day of September, 2010

David J. Kappos
*Director of the United States Patent and Trademark Office*